W. H. H. MORELOCK.
RESILIENT WHEEL.
APPLICATION FILED DEC. 8, 1910.
1,003,775.
Patented Sept. 19, 1911.
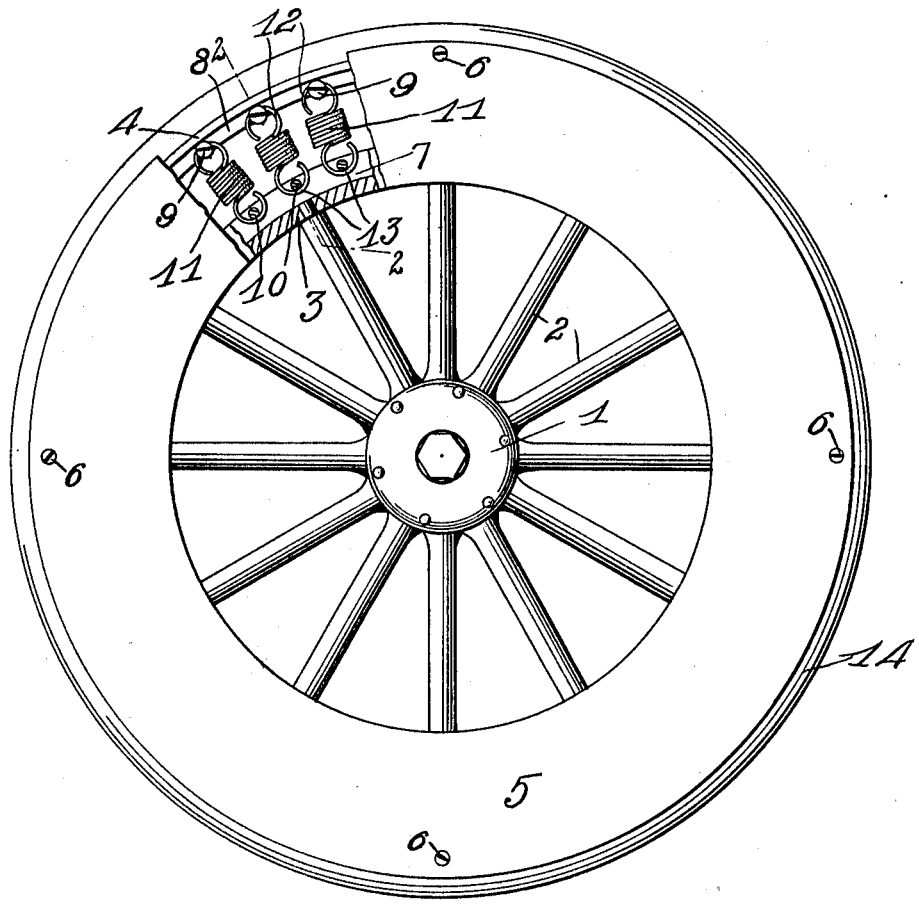
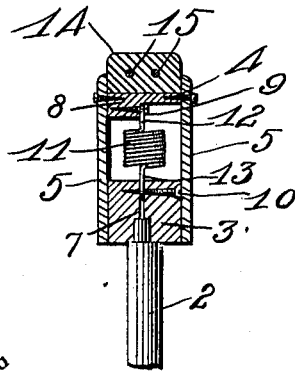
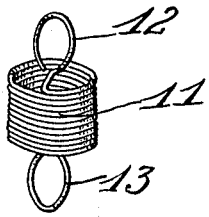
Witnesses
J. R. Pierce.
O. B. Hopkins.
Inventor
W. H. H. Morelock.
by H. B. Willson & Co.
Attorneys

UNITED STATES PATENT OFFICE.

WILLIAM H. H. MORELOCK, OF JONESBORO, ARKANSAS, ASSIGNOR OF ONE-HALF TO A. B. COLE, OF JONESBORO, ARKANSAS.

RESILIENT WHEEL.

1,003,775.  Specification of Letters Patent.  Patented Sept. 19, 1911.

Application filed December 8, 1910. Serial No. 596,263.

*To all whom it may concern:*

Be it known that I, WILLIAM H. H. MORELOCK, a citizen of the United States, residing at Jonesboro, in the county of Craighead and State of Arkansas, have invented certain new and useful Improvements in Resilient Wheels; and I do declare the following to be a full, clear, and exact description of the invention, such as will enable others skilled in the art to which it appertains to make and use the same.

This invention relates to improvements in resilient wheels for vehicles.

One object of the invention is to provide a wheel of this character having an improved construction and arrangement of springs whereby the shocks and jars occasioned by the wheels passing over rough surfaces will be entirely absorbed and the weight of the vehicle suspended on the springs in the wheel.

Another object is to provide a wheel of this character possessing all the advantages of a pneumatic tire and none of the disadvantages.

With the foregoing and other objects in view, the invention consists of certain novel features of construction, combination and arrangement of parts as will be more fully described and particularly pointed out in the appended claim.

In the accompanying drawings: Figure 1 is a side view of a wheel constructed in accordance with my invention parts of the same being broken away and in section to more clearly illustrate the construction and arrangement of the parts; Fig. 2 is a vertical cross sectional view through a portion of the wheel taken on the line 2—2 of Fig. 1; Fig. 3 is a detail view of one of the springs removed from the wheel.

Referring more particularly to the drawings, 1 denotes the hub, 2 the spokes and 3 the felly of my improved wheel. Arranged around and spaced a suitable distance from the felly 3 is a rim or tire 4 on the opposite sides of which and slidably engaged with the opposite sides of the felly are annular side plates 5 one of which may be integral with the rim or tire or both of the same rigidly connected thereto by screws or other fastening devices 6 as shown. When thus arranged the side plates 5 cover or inclose the space between the felly and the rim or tire.

In the outer edge of the felly is formed an annular groove or channel 7 and on the inner side of the rim or tire is formed an annular flange 8. In the flange 8 and spaced a suitable distance apart is an annular series of screws or headed studs 9 while in the felly 3 is arranged a series of transversely disposed screws or bolts 10 which intersect or cross the groove 7 formed in the felly. Arranged in the space between the felly and the rim or tire is a series of short coiled springs 11 the opposite ends of which are bent to form outer loops 12 and inner loops 13. The outer loops 12 are adapted to be engaged with the studs 9 while the inner loops 13 are inserted in the groove 7 of the felly and are engaged by the screws or bolts 10 arranged therein.

While the wheel may be used as described and travel on the rim or tire 4, I preferably provide an outer cushion tire 14 formed of rubber or other suitable material and arranged around the tire 4. The cushion tire may be secured to the rim or tire 4 in any suitable manner but is preferably held in position by the outer edges of the side plates 5 which are extended a slight distance beyond the outer surface of the tire 4 and form a channel to receive the cushion tire. The tire 14 may be of any suitable shape and is preferably provided with binding wires 15 which are embedded therein as shown.

By constructing the wheel and arranging the springs as herein shown and described it will be seen that the weight of the vehicle will be suspended from the springs in the upper portion of the wheel as the latter revolves which arrangement provides a more elastic or resilient support than when the load is supported by the compression of the springs.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention what I claim is:

In a resilient wheel, a hub, a series of spokes secured thereto, a felly arranged on said spokes, said felly having formed in its outer edge an annular groove, a series of transversely disposed screws arranged through said felly and across the groove therein, a rim arranged around and spaced a suitable distance from said felly, an annular flange formed on the inner side of said rim, a series of headed studs secured to said flange, a series of coiled springs arranged in the space between the felly and rim and having on their inner and outer ends loops, the loops on said inner ends being adapted to be inserted in the groove in said felly and to receive the screws passing through said groove, said outer loops being adapted to engage the headed studs on said rim and means whereby the sides of the space between said felly and rim are covered and the springs inclosed.

In testimony whereof I have hereunto set my hand in presence of two subscribing witnesses.

WILLIAM H. H. MORELOCK.

Witnesses:
E. L. MINTON,
W. M. TOLBERT.

Copies of this patent may be obtained for five cents each, by addressing the "Commissioner of Patents, Washington, D. C."